United States Patent

Allen

Patent Number: 5,423,708
Date of Patent: Jun. 13, 1995

[54] MULTI-LEGGED, WALKING TOY ROBOT

[76] Inventor: Roger D. Allen, 1705 Higgins Rd. SE., Port Orchard, Wash. 98366

[21] Appl. No.: 291,541

[22] Filed: Aug. 15, 1994

[51] Int. Cl.⁶ .................. A63H 7/00; A63H 11/00; B62D 51/06
[52] U.S. Cl. .................. 446/356; 446/353; 180/8.6
[58] Field of Search .......... 446/153, 156, 158, 352, 446/353, 355, 356, 358, 376, 377, 381, 487; 186/8.1, 8.5, 8.6

[56] References Cited

U.S. PATENT DOCUMENTS

| | | | |
|---|---|---|---|
| D. 292,110 | 9/1987 | Tamakoshi . | |
| 882,403 | 3/1908 | Mikolasek . | |
| 1,762,574 | 6/1930 | Fox | 446/377 X |
| 2,827,735 | 3/1958 | Grimm, Jr. . | |
| 2,918,734 | 12/1959 | Barr | 446/356 X |
| 2,924,042 | 2/1960 | Byrtus | 446/356 |
| 3,331,463 | 7/1967 | Kramer | 446/353 X |
| 3,660,931 | 5/1972 | Gardel et al. . | |
| 4,018,002 | 4/1977 | Holden . | |
| 4,365,437 | 12/1982 | Jameson . | |
| 4,614,504 | 9/1986 | Yamasaki | 446/356 |
| 4,629,440 | 12/1986 | McKittrick, Jr. et al. | 446/356 |
| 4,834,200 | 5/1989 | Kajita . | |
| 5,040,626 | 8/1991 | Paynter . | |
| 5,127,484 | 7/1992 | Bares et al. . | |
| 5,158,493 | 10/1992 | Morgrey . | |

FOREIGN PATENT DOCUMENTS 3123242  10/1978  Japan .................. 446/377

Primary Examiner—Robert A. Hafer
Assistant Examiner—D. Neal Muir
Attorney, Agent, or Firm—Kevin A. Sembrat

[57] ABSTRACT

A robot in the form of a toy simulating a spider is provided wherein the robot is capable of maintaining balance while walking, turning and running in a race-type setting on level ground and over a ramp or small obstacles. A preferrred embodiment of the robot has four operatively cooperating legs which are remotely controlled by a motor on each of the left side and the right side of the robot. A gear reduction mechanism to improve torque is considered. The operative cooperating legs are designed such that alternate legs on each side are in a DOWN position when mirrored legs are in a DOWN position, thereby providing balance while walking with four of the eight legs in a DOWN position while remaining legs are in an UP position.

6 Claims, 3 Drawing Sheets

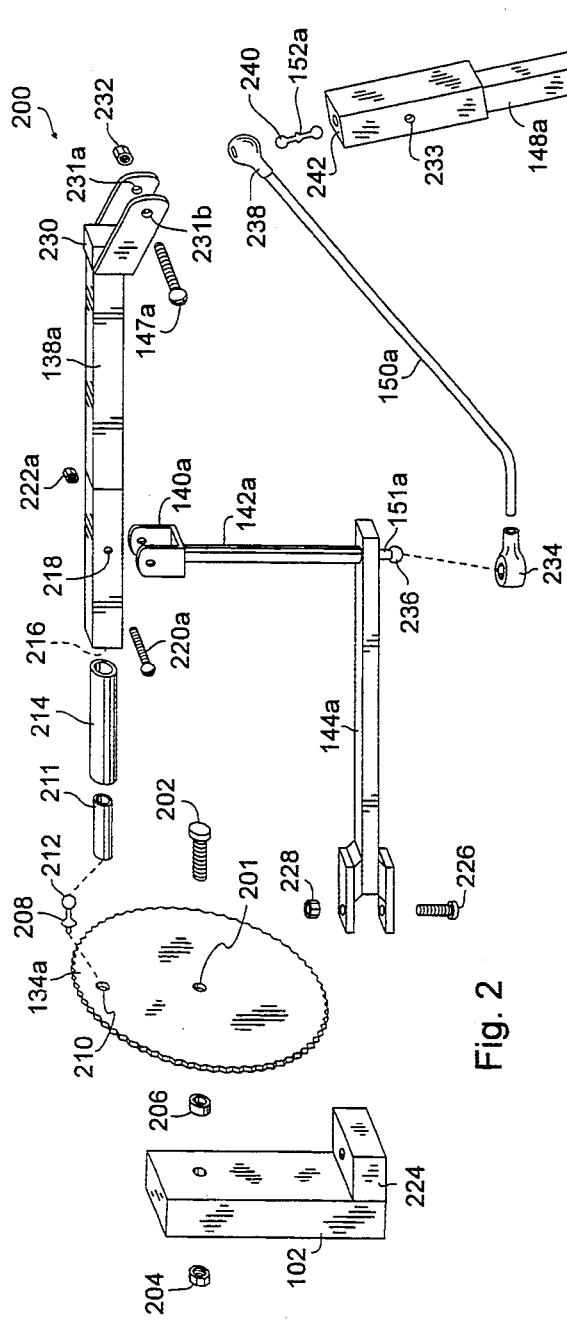
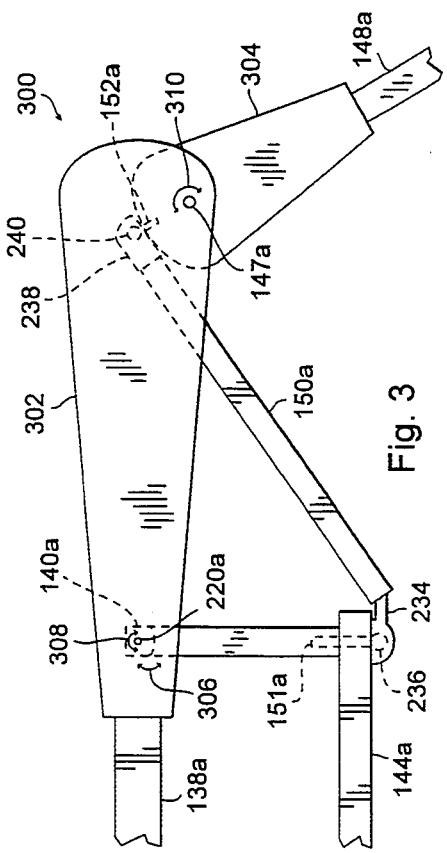
Fig. 2
Fig. 3

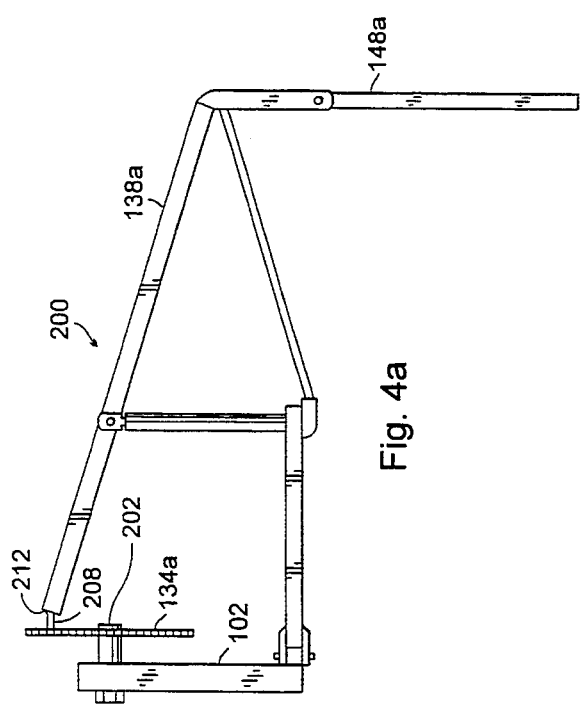
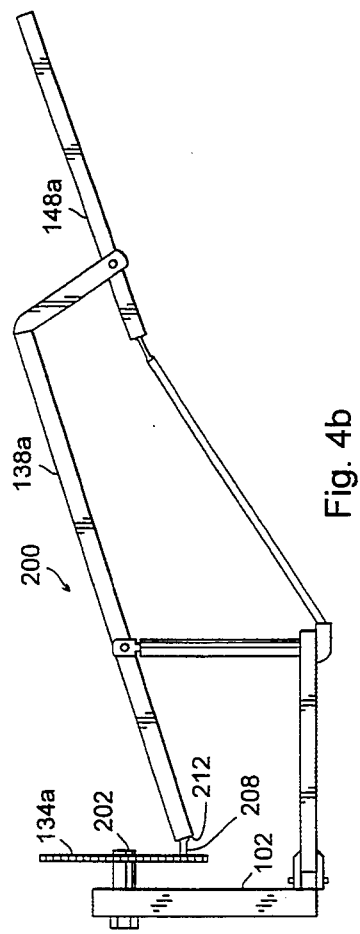

MULTI-LEGGED, WALKING TOY ROBOT

BACKGROUND OF THE INVENTION

1. Field of the Invention

The present invention relates generally to robots characterized by their ability to walk while maintaining their balance, and, more particularly, to toy robots that are capable of maintaining balance while walking, turning and running in a race-type setting on level ground and over a ramp or small obstacles.

2. Description of the Related Art

As is well-known in the art, while efforts have been directed towards simulated walking and/or turning, the problem of balance has apparently been so resistant to solution that most robots available in the market place today employ wheels and/or continuously driven tracks to enable the robot to move over the ground by rolling or gliding.

Nevertheless, while most robots available in the marketplace today employ wheels and/or tracks to permit movement over the ground, the related art is replete with long-standing efforts to provide a robot capable of walking. As evidence of this fact, attention is directed to U.S. Pat. No. 882,403, issued in 1908 in the name of Mikolsek, wherein a walking toy biped is disclosed in which the toy's left and right legs are alternately raised and lowered by a crank assembly; and, in order to maintain the toy's balance, a liquid-filled weight is coupled to the crank assembly for shifting the toy's center of gravity laterally to the left or to the right over the ground engaged supporting leg.

In 1958, U.S. Pat. No. 2,827,735, issued in the name of H. E. Grimm, Jr., disclosed a six-legged animal wherein two legs on one side of the toy were coupled to, and driven by, the same mechanism as was coupled to, and which drove, one leg on the opposite side of the toy so as to maintain the toy's balance.

More recently, U.S. Pat. No. 3,660,931, issued in the name of Gardel et al., U.S. Pat. No. 4,365,437, issued in the name of Jameson, and U.S. Pat. No. 4,834,200, issued in the name of Kajita, presumably disclose state-of-the-art robotic technologies. In the Gardel reference, issued in 1972, a walking doll is disclosed having legs mounted at an angle to the axis of the doll's torso so that as the legs move relative to the body, the body tilts to shift the center of gravity of the doll over the leg planted on the floor. In the Jameson reference, issued in 1982, the legs of the toy are crank-operated and a gyroscope is provided to prevent rotation and maintain stability. The Kajita reference, which issued in 1989, discloses a walking robot wherein the lengths of the robot's legs and the angles between each foot and leg are continuously adjusted so as to maintain the robot's center of gravity within the support area defined by the robot's footprint.

Finally, U.S. Pat. No. 5,158,493, issued in 1992 in the name of Morgrey, discloses a robot which simulates walking similar to that of a human being, wherein the robot alternately lifts its left and right leg/foot assemblies off the ground and strides forward with the raised leg/foot assembly while the robot's weight is supported and balanced by the leg/foot assembly that is planted on the ground.

However, notwithstanding the state-of-the-art as exemplified by the foregoing patents, no known related art robot exists, either in patented or published art, or in the form of a commercially available robot, wherein the robot is capable of maintaining balance while walking, turning and running in a race-type setting on level ground and over a ramp or small obstacles.

Consequently, a need has been felt for providing a robot that is economically feasible to manufacture, wherein the robot is capable of maintaining balance while walking, turning and running in a race-type setting on level ground and over a ramp or small obstacles.

SUMMARY OF THE INVENTION

It is therefore an object of the present invention to provide an improved robot that is capable of maintaining balance while walking, turning and running in a race-type setting on level ground and over a ramp or small obstacles.

It is a feature of the present invention to provide a robot with jointed legs.

It is another feature of the present invention to provide motors on each side of the robot, wherein the motors are independently controlled remotely to permit turning.

Briefly described according to one embodiment of the present invention a robot in the form of a toy simulating a spider is provided wherein the robot is capable of maintaining balance while walking, turning and running in a race-type setting on level ground and over a ramp or small obstacles. A preferred embodiment of the robot has four operatively cooperating legs which are remotely controlled by a motor on each of the left side and the right side of the robot. A gear reduction mechanism to improve torque is considered. The operative cooperating legs are designed such that alternate legs on each side are in a DOWN position when mirrored legs are in a DOWN position, thereby providing balance while walking with four of the eight legs in a DOWN position while remaining legs are in an UP position.

Another preferred embodiment of the present invention is a toy simulating a walking spider, wherein the toy comprises: a frame having a left side and a right side; a left plurality of cooperatively rotating interconnected gears attached to the left side of the frame, and a right plurality of cooperatively rotating interconnected gears attached to the right side of the frame, wherein a first gear in each of the left and right plurality of gears is positioned to operatively cooperate with an adjacent second gear, such that rotation of the first gear in each of the left and right plurality of gears about a first axis in a first direction urges the rotation of the adjacent second gear about a second axis in an second opposing direction; a left plurality of jointed spider legs attached to the left plurality of gears, and a right plurality of jointed spider legs attached to the right plurality of gears, wherein each jointed spider leg comprises: a main arm having an innermost portion and an outermost portion; a secondary arm having an innermost portion and an outermost portion, wherein the innermost portion of the secondary arm is attached to the outermost portion of the main arm; a support beam for supporting the main arm, wherein the support beam is attached to the frame; wherein the innermost portion of the main arm of a first jointed spider leg in each of the left and right plurality of jointed spider legs is attached to a first predetermined position on the first gear in each of the left and right plurality of gears, and the innermost portion of the main arm of a second jointed spider leg in each of the left and right plurality of jointed spider legs is attached to a third gear, which third gear is separated by the adjacent second gear, to a second predetermined position on the third gear, which second predetermined position is different than the first predetermined position, such that the first and second predetermined positions urge the first jointed spider leg in each of the left and right plurality of jointed spider legs into an up position when the second jointed spider leg in each of the left and right plurality of jointed spider legs is urged into a down position; and motor means for driving the first gear of the left and right pluralities of gears in the first direction, thereby to rotate the adjacent second gear.

An advantage of the present invention is that the robot may advance on level ground and over a ramp or small obstacle.

Another advantage of the present invention is that the robot may be used in a race-type setting against other similar robots.

Further, a preferred embodiment of the present invention is a toy that has eight jointed legs and ambulates in a manner similar to that of a spider, thereby attracting the attention of a user of the toy, such as a child.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is an exploded side view of a preferred embodiment of a jointed leg;

FIG. 3 is a side elevational view of an assembled leg joint, showing broken line illustrations of interconnected parts within decorative molding;

FIG. 4a is a side elevational view showing the geared mounting of one jointed leg to the frame, with the jointed leg positioned in a DOWN position; and FIG. 4b is a side elevational view showing the geared mounting of one jointed leg to the frame, with the jointed leg positioned in an UP position.

DESCRIPTION OF THE PREFERRED EMBODIMENTS

1. Detailed Description of the Figures

Figure 1:
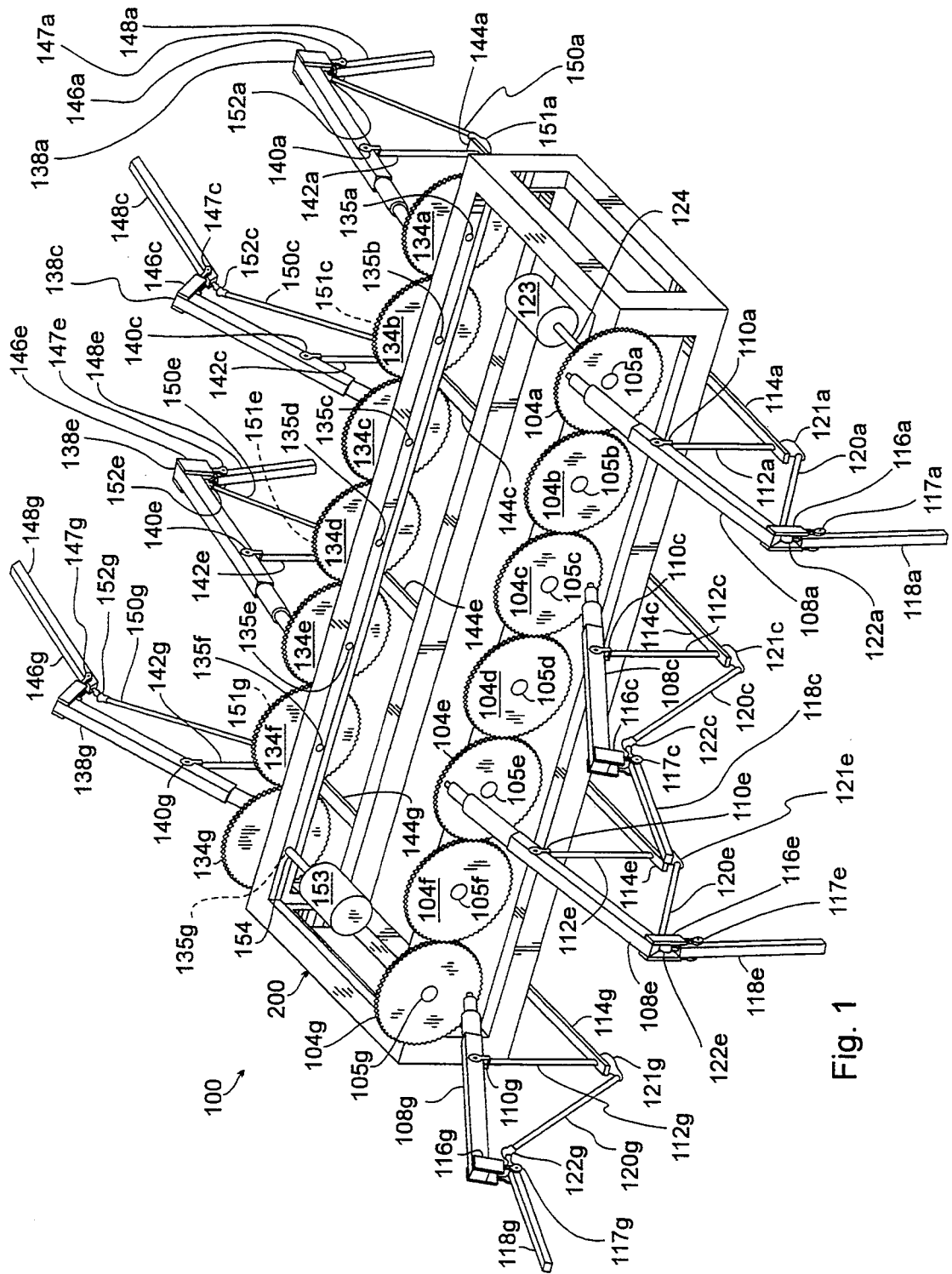
FIG. 1 is a front, top, and left side perspective view showing the geared mounting of jointed legs to a frame, according to a preferred embodiment of the present invention.

Referring now to FIG. 1, a robotic octopod, generally indicated at 100, embodying features of the present invention has been illustrated. As here shown, the illustrative robotic octopod 100 includes a frame 102 upon which is fixedly-mounted a left plurality of operatively cooperating gears 104a, 104b, 104c, 104d, 104e, 104f, 104g, through axles 105a, 105b, 105c, 105d, 105e, 105f, 105g, on which the left plurality of gears rotate about an axis, and a right plurality of operatively cooperating gears 134a, 134b, 134c, 134d, 134e, 134f, 134g, through axles 135a, 135b, 135c, 135d, 135e, 135f, 135g, on which the right plurality of gears rotate about an axis.

A left main arm 108a, 108c, 108e, 108g, pivots centrally upon a swivel bracket 110a, 110c, 110e, 110g, respectively, which brackets are fixedly mounted upon support bars 112a, 112c, 112e, 112g, respectively, which bars extend upwardly from support beams 114a, 114c, 114e, 114g, respectively, which beams are attached to the frame 102. A first end of the left main arm 108a, 108c, 108e, 108g, pivots upon a ball screw (shown in FIG. 2) which is attached to gears 104a, 104c, 104e, 104g, respectively.

A second end of the left main arm 108a, 108c, 108e, 108g, supports a joint bracket 116a, 116c, 116e, 116g through which an axle 117a, 117c, 117e, 117g, passes, upon which axle a left secondary arm 118a, 118c, 118e, 118g pivots, off-centered. A tie bar 120a, 120c, 120e, 120g pivots multi-dimensionally upon a ball screw 121a, 121c, 121e, 121g, attached on one end to the support beam 114a, 114c, 114e, 114g, respectively, and pivots multi-dimensionally upon a second ball screw 122a, 122c, 122e, 122g, attached at the other end of the tie bar to an end of the secondary arm 118a, 118c, 118e, 118g, respectively.

According to one embodiment of the present invention, rotating means 123 rotates the gear 104a. In a preferred embodiment, rotating means is a motor which is remotely controlled to rotate a drive shaft 124, wherein the drive shaft is mounted directly to the axle 105a, thereby to rotate the axle and the gear 104a. Since the left gears 104a–g operatively cooperate together such that rotation of a first gear in a first direction will cause rotation of a second adjoining gear in an opposing second direction, those skilled in the art will appreciate the fact that rotating means 123 and the accompanying drive shaft 124 may be directly mounted to other axles 105b–g in other preferred embodiments. In another preferred embodiment, additional cooperating gears (not shown), preferably of different size diameters, are attached between the drive shaft 124 and the axle 105a to function as a gear reduction system to reduce torque between the drive shaft and the axle 105a.

Similarly, and in mirrored opposition to the left side of the frame 102, as described above, a right main arm 138a, 138c, 138e, 138g, pivots centrally upon a swivel bracket 140a, 140c, 140e, 140g, respectively, which brackets are fixedly mounted upon support bars 142a, 142c, 142e, 142g, respectively, which bars extend upwardly from support beams 144a, 144c, 144e, 144g, respectively, which beams are attached to frame 102. A first end of the right main arm 138a, 138c, 138e, 138g, pivots upon a ball screw (shown in FIG. 2) which is attached to gears 134a, 134c, 134e, 134g, respectively.

A second end of the right main arm 138a, 138c, 138e, 138g, supports a joint bracket 146a, 146c, 146e, 146g through which an axle 147a, 147c, 147e, 147g, passes, upon which axle a right secondary arm 148a, 148c, 148e, 148g pivots, off-center. A tie bar 150a, 150c, 150e, 150g pivots multi-dimensionally upon a ball screw 151a, 151c, 151e, 151g, attached on one end to the support beam 144a, 144c, 144e, 144g, respectively, and pivots multi-dimensionally upon a second ball screw 152a, 152c, 152e, 152g, attached at the other end of the tie bar to an end of the secondary arm 148a, 148c, 148e, 148g, respectively.

According to one embodiment of the present invention, rotating means 153 rotates the gear 134a. In a preferred embodiment, rotating means 153 is a motor which is remotely controlled to rotate a drive shaft 154, wherein the drive shaft is mounted directly to the axle 135g, thereby to rotate the axle and the gear 134g. Since the right gears 134a–g operatively cooperate together such that rotation of a first gear in a first direction will cause rotation of a second adjoining gear in an opposing second direction, those skilled in the art will appreciate the fact that rotating means 153 and the accompanying drive shaft 154 may be directly mounted to other axles 135a–f in other preferred embodiments.

Referring to FIG. 2, the right front jointed leg, generally indicated at 200, embodying features of the present invention has been illustrated in an exploded side view. The gear 134a is rotatably mounted through an orifice 201 to the frame 102 about the axle 135a. A preferred embodiment of the gear 134a is a plastic material. A preferred embodiment of the axle 135a is a threaded bolt 202 affixed with a nut 204. A nylon bushing 206 provides spacing between the frame 102 and the gear 134a to permit undisturbed rotation thereof.

A ball screw 208 is mounted to the gear 134a at a point 210 on the face of the gear 134a. A preferred embodiment of the ball screw 208 is a metal material. A nylon bushing 211 slips over the ball screw head 212, thereby to grasp the ball screw head 212 in a slidable manner which permits pivotal movement of the nylon bushing in multiple directions. A metal slip joint 214 encases the nylon bushing 211 before the combination is fixedly mounted within a first end 216 of the right main arm 138a. The main arm 138a is pivotally mounted through an orifice 218 to the swivel bracket 140a about the axle 220a, in order to permit vertical movement of each end of the main arm 138a as the first end 216 follows the up-and-down and side-to-side rotational movement of the gear 134a when rotating. A preferred embodiment of the axle 220a is a threaded bolt affixed with a nut 222a.

The swivel bracket 140a is rotatably mounted atop the support bar 142a, in order to permit lateral movement of the main arm 138a as the first end 216 follows the up-and-down and side-to-side rotational movement of the gear 134a when rotating. The support bar 142a is fixedly mounted to the support beam 144a, which support beam is fixedly mounted to a frame mounting 224 with a bolt 226 and a nut 228 combination.

A second end 230 of the right main arm 138a supports the joint bracket 146a, which has an orifice 231a, 231b, through which the axle 147a passes, to be affixed with a nut 232, upon which axle the right secondary arm 148a is pivotally mounted through an orifice 233, thereby to pivot vertically, relative to the main arm 138a. A first end 234 of the tie bar 150a pivots multi-directionally upon a head 236 of a ball screw 151a, which ball screw is attached to the support beam 144a. A second end 238 of the tie bar 150a pivots multi-directionally upon a head 240 of the ball screw 152a, which ball screw is attached to a first end 242 of the secondary arm 148a.

FIG. 3 shows a side elevated view of an assembled leg joint 300, with the main arm 138a and the secondary arm 148a covered with a decorative molding 302 and 304, respectively. A preferred embodiment of the decorative molding 302, 304 is a molded plastic material. Broken line illustrations show the assembled leg joint with the pivotal connections of the first end 234 of the tie bar 150a to the head 236 of the ball screw 151a, which ball screw is attached to the support beam 144a. Further shown is the pivotal connection of the second end 238 of the tie bar 150a to the head 240 of the ball screw 152a. The main arm 138a is mounted within the swivel bracket 140a, which bracket pivots in a side-to-side horizontal direction shown by an arrow 306. Further, the main arm 138a pivots about the axis 220a in an up-and-down vertical direction, as show by an arrow 308. Finally, the secondary arm 148a pivots about the axis 147a in an up-and-down vertical direction, relative to the main arm 138a, as shown by an arrow 310.

FIG. 4a shows a side elevational view of the right front jointed leg 200, with the secondary arm 148a positioned below the frame 102 when the gear 134a is rotated to position the head 212 of the ball screw 208 above the axle 202, thereby in a DOWN position relative to the frame 102. FIG. 4b shows a side elevational view of the right front jointed leg 200, with the secondary arm 148a positioned above the frame 102 when the gear 134a is rotated to position the head 212 of the ball screw 208 below the axle 202, thereby in an UP position relative to the frame 102. In a similar manner, when the gear 134a is rotated to a first side of the axle 202, the secondary arm 148a is positioned to an opposing side of the axle 202, partly between the UP position and the DOWN position. One skilled in the art will appreciate the fact that as the gear 134a is rotated, the secondary arm 148a moves in an approximately elliptical pattern alternating from the UP position, to one side, to the DOWN position, and to an opposing side.

2. Operation of the Preferred Embodiment

Although the plurality of gears 104a–g operate independently of the plurality of gears 134a–g, each plurality of gears 104a–g and 134a–g operatively cooperate such that rotation of a first gear in a first direction will cause rotation of a second adjoining gear in an opposing second direction. Therefore, one skilled in the art will appreciate the fact that rotating a first gear in a first direction will cause each alternate gear to rotate in the same first direction. The left main arms 108a, 108c, 108e, 108g, are attached to the alternate gears 104a, 104c, 104e, 104g, respectively, thereby to be attached to gears that rotate in the same direction.

As shown in FIG. 1, the main arms 108a and 108e, which are thereby alternating arms, are attached to the gears 104a and 104e, respectively in the same relative position, shown here at about eleven o'clock on a clock face (not shown). Similarly, the main arms 108c and 108g, which are thereby alternating arms, are attached to the gears 104c and 104g, respectively in the same relative position, shown here at about five o'clock on the clock face. In this manner of connection, when the gears 104a–g are rotated, thereby rotating the alternating gears 104a, 104c, 104e, 104g in the same direction, and the main arms 108a and 108e are positioned above the axles 105a and 105e, thereby forcing the secondary arms 118a and 118e into a DOWN position as shown in FIG. 4a, the main arms 108c and 108g will be positioned below the axles 105c and 105g, thereby forcing the secondary arms 118c and 118g into an UP position as shown in FIG. 4b.

Moreover, as the gears 104a, 104c, 104e, and 104g rotate to position each main arm 108a, 108c, 108e, and 108g to a first side of the axles 105a, 105c, 105e, and 105g, the secondary arms 118a, 118c, 118e, and 118g will be forced to an opposing side of the axles 105a, 105c, 105e, and 105g, thereby readying respective secondary arms for a DOWN position in a new location, thereby moving the frame 102 in a lateral direction when the secondary arms are placed in the new location on the ground.

Operation of the plurality of gears 134a–g and attached legs 138a, 138c, 138e, 138g mirrors, but is independent of, the plurality of gears 134a–g and attached legs 108a, 108c, 108e, 108g. The rotating means 153, which rotates the gears 134a–g independently of the rotating means 123, thereby which rotates the gears 104a–g, permits selective operation of the left and right side of the frame 102. Therefore, with both rotating means 123 and 153 operating under independent remote control, a speed of rotation of the left side may be different than a speed of rotation of the right side, thereby permitting the frame 102 to be turned during walking.

The foregoing description is included to illustrate the operation of the preferred embodiment and is not meant to limit the scope of the invention. Although preferred embodiments of the invention have been described in conjunction with the right front jointed leg, generally indicated at 200 and specifically including the main arm 138a, the secondary arm 148a, and interconnecting parts associated with that particular leg, it will be understood that the principles of the invention may be extended to each other leg.

Additionally, various decorative moldings may cover various aspects of the frame and legs to emulate the body of a spider or other preferred structure. In particular, one preferred embodiment of a decorative molding is a watertight frame that floats in water or other liquid, wherein the present invention swims when the legs move.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. A toy simulating a walking spider, wherein the toy comprises:
   a frame having a left side and a right side;
   a left plurality of cooperatively rotating interconnected gears attached to said left side of said frame, and a right plurality of cooperatively rotating interconnected gears attached to said right side of said frame, wherein a first gear in each of said left and right plurality of gears is positioned to operatively cooperate with an adjacent second gear, such that rotation of said first gear in each of said left and right plurality of gears about a first axis in a first direction urges the rotation of said adjacent second gear about a second axis in a second opposing direction;
   a left plurality of jointed spider legs attached to said left plurality of gears, and a right plurality of jointed spider legs attached to said right plurality of gears, wherein each jointed spider leg comprises:
      a main arm having an innermost portion and an outermost portion with a joint bracket supported by and extending from said outermost portion of said main arm;
      a secondary arm having an innermost portion and an outermost portion, wherein said secondary arm is pivotally attached to said main arm joint bracket at a predetermined distance from said innermost portion of said secondary arm;
      support beam means for supporting said main arm at a predetermined distance from said innermost portion of said main arm, wherein said support beam means is attached to said frame, and said support beam means is additionally attached to said innermost portion of said secondary arm thereby to be multi-dimensionally pivotable upon said secondary arm;
   wherein said innermost portion of said main arm of a first jointed spider leg in each of said left and right plurality of jointed spider legs is attached to a first predetermined position on said first gear in each of said left and right plurality of gears, and said innermost portion of said main arm of a second jointed spider leg in each of said left and right plurality of jointed spider legs is attached to a third gear, which third gear is separated by said adjacent second gear, to a second predetermined position on said third gear, which second predetermined position is different than said first predetermined position, such that said first and second predetermined positions urge said first jointed spider leg in each of said left and right plurality of jointed spider legs into an up position when said second jointed spider leg in each of said left and right plurality of jointed spider legs is urged into a down position; and
   motor means for driving said first gear of said left and right pluralities of gears in said first direction, thereby to rotate said adjacent second gear.

2. The toy as claimed in claim 1, wherein said first gear in each of said left and right plurality of gears further comprises:
   an axle aligned according to said first axis, about which axle said first gear rotates.

3. The toy as claimed in claim 2, wherein said motor means is a motor with a drive shaft mounted to said axle, thereby to rotate said axle and said first gear.

4. A toy simulating a walking spider, wherein the toy comprises:
   a frame having a left side and a right side;
   a left plurality of gears attached to said left side of said frame, and a right plurality of gears attached to said right side of said frame, wherein a first gear in each of said left and right plurality of gears is positioned to operatively cooperate with an adjacent second gear, such that rotation of said first gear in each of said left and right plurality of gears about a first axis in a first direction urges the rotation of said adjacent second gear about a second axis in a second opposing direction;
   a left plurality of jointed spider legs attached to said left plurality of gears, and a right plurality of jointed spider legs attached to said right plurality of gears, wherein each jointed spider leg comprises:
      a main arm having an innermost portion and an outermost portion with a joint bracket supported by and extending from said outermost portion of said main arm;
      a secondary arm having an innermost portion and an outermost portion, wherein said secondary arm is pivotally attached to said main arm joint bracket at a predetermined distance from said innermost position of said secondary arm;
      support beam means for supporting said main arm at a predetermined distance from said innermost portion of said main arm, wherein said support beam means is attached to said frame, and said support beam means is additionally attached to said innermost portion of said secondary arm thereby to be multi-dimensionally pivotable upon said secondary arm;
   wherein said left plurality of jointed spider legs is attached to alternating gears of said left plurality of gears, and said right plurality of jointed spider legs is attached to alternating gears of said right plurality of gears, in a first set of predetermined gear positions that thereby urge alternating jointed spider legs from said left and right plurality of jointed spider legs into an up position when a second set of jointed spider legs from said left and right plurality of jointed spider legs is urged into a down position; and driving means for driving said first gear of said left and right pluralities of gears in said first direction, thereby to rotate said adjacent second gear in said second opposing direction.

5. The toy as claimed in claim 4, wherein said first gear in each of said left and right plurality of gears further comprises:

an axle aligned according to said first axis, about which axle said first gear rotates.

6. The toy as claimed in claim 5, wherein said driving means is a motor with a drive shaft mounted to said axle, thereby to rotate said axle and said first gear.

* * * * *